E. G. SHANE.
AUTOMOBILE SIGNAL.
APPLICATION FILED NOV. 25, 1918.
1,345,557.
Patented July 6, 1920.
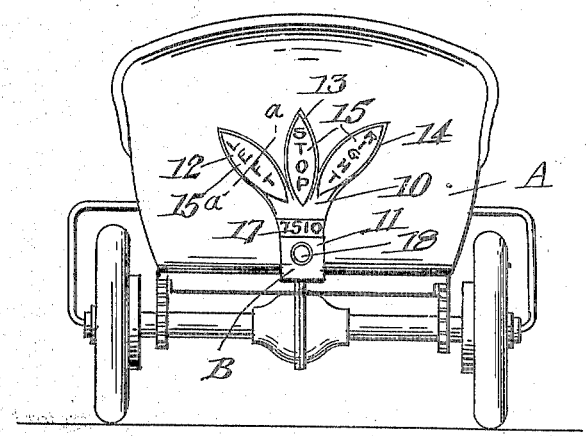
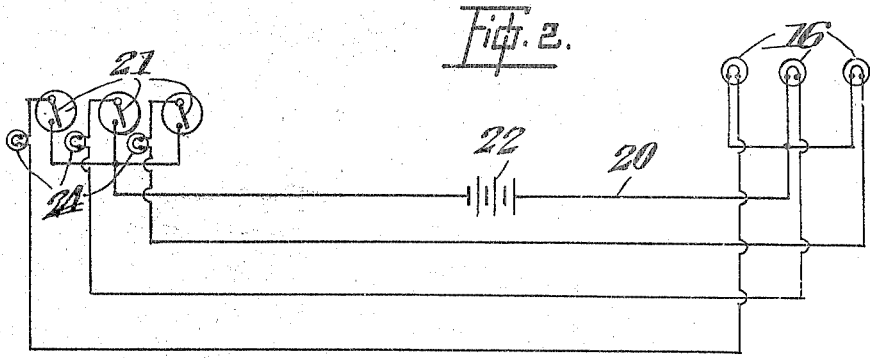
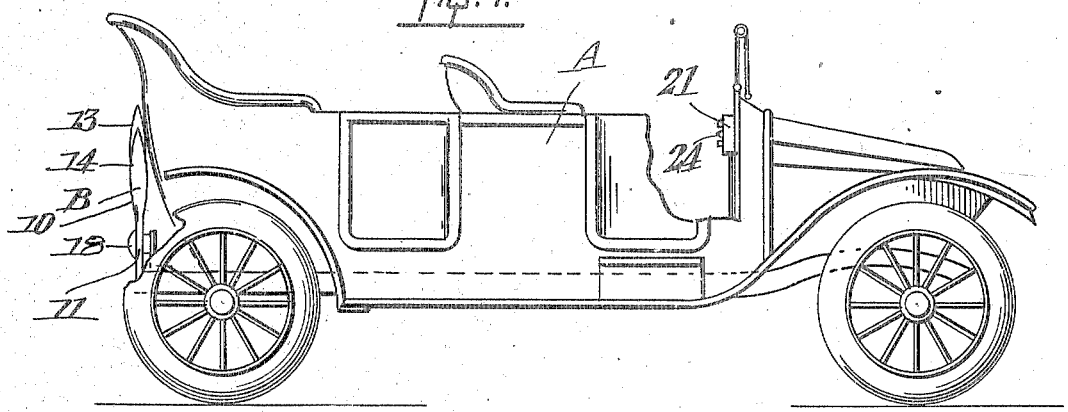
INVENTOR
EDGAR G. SHANE
BY Fetherstonhaugh & Co
ATTY'S.

UNITED STATES PATENT OFFICE.

EDGAR GEORGE SHANE, OF OTTAWA, ONTARIO, CANADA.

AUTOMOBILE-SIGNAL.

1,345,557.      Specification of Letters Patent.      Patented July 6, 1920.

Application filed November 25, 1918. Serial No. 264,046.

*To all whom it may concern:*

Be it known that I, EDGAR GEORGE SHANE, a subject of the King of Great Britain, and resident of the city of Ottawa, Province of Ontario, Dominion of Canada, have invented certain new and useful Improvements in Automobile-Signals, of which the following is a specification.

This invention relates to improvements in automobile signals and the objects of the invention are to provide simple and effective devices by which the driver of the automobile may signal to those in the rear his intention to turn in either direction or to stop.

Further objects are to generally improve and simplify the construction of the device, to enable it to better perform the functions required of it, and it consists essentially of the improved construction herein after described in detail in the accompanying specification and drawings.

In the drawings:

Figure 1 is a side view partly broken away showing an automobile having my invention applied thereto.

Fig. 2 is a rear end view of the automobile.

Fig. 3 is a section on the line 3—3 of Fig. 2.

Fig. 4 is a diagrammatic view of the electrical connection.

In the drawings like characters of reference indicate corresponding parts in all figures.

Referring to the drawings, A represents an automobile of any well known type, and B represents the indicator mounted on the rear thereon, comprising a casing 10 having a lower part 11 and three branches 12, 13 and 14 on the upper part. The casing may be formed of any convenient material such as, metal or wood. The three branches 12, 13 and 14 are tapered to a point, and the branches 12 and 14 diverge outward.

Transparent windows 15 are formed in the rear of the branches, and these windows have marked suitable signals thereto, such as words Left, Right and Stop, the windows being illuminated by a suitable incandescent electric lamp 16 placed in the rear of this.

The license number may also be displayed on a plate 17 at the bottom of the casing and the rear signal lamp may also be located in the bottom of the signal plate.

The electric lamps 16 in the branches 12, 13 and 14 are connected by suitable electric conductors 20 with controlling switches 21 located adjacent to the driver's seat. The conductors 20 also include in the circuit a suitable battery 22, the electrical wiring being as indicated in Fig. 4. In this way it will be seen that the driver by pressing the controlling switch may illuminate either of the branches to indicate the desired signal to those in the rear of the automobile.

In order to indicate to the driver that the signals are being properly given at the rear of the automobile I provide adjacent to the switches small signal lamps 24, adjacent to the switches 21 and included in the circuit with the battery and lamp 16.

As many changes could be made in the above construction and many apparently widely different embodiments of my invention within the scope of the claim constructed without departing from the spirit or scope thereof, it is intended that all matter contained in the accompanying specification and drawings shall be interpreted as illustrative and not in a limiting sense.

What I claim as my invention is:

A direction indicator for vehicles comprising a casing formed with a downward extension and a plurality of upwardly extending hollow branches including a vertical branch and side branches diverging outwardly from the vertical branch to a point toward opposite sides of the vehicle, a rear light mounted in the downward extension of the casing, and a number plate mounted in said extension directly above the rear light, so as to be illuminated thereby.

In witness whereof I have hereunto set my hand in the presence of two witnesses.

EDGAR GEORGE SHANE.

Witnesses:
RUSSEL B. SMART,
PEARL M. GARRARD.